United States Patent
Schulz (12)

(10) Patent No.: US 6,514,019 B1
(45) Date of Patent: Feb. 4, 2003

(54) BORING TOOL COMPRISING A REPLACEABLE CUTTING INSERT WHICH IS SECURED AGAINST DETACHING

(75) Inventor: Armin Schulz, Sigmaringen (DE)

(73) Assignee: Dr. Joerg Guehring, Albstadt (DE)

( * ) Notice: Subject to any disclaimer, the term of this patent is extended or adjusted under 35 U.S.C. 154(b) by 0 days.

(21) Appl. No.: 09/764,992

(22) PCT Filed: Jul. 21, 1999

(86) PCT No.: PCT/EP99/05217

§ 371 (c)(1),
(2), (4) Date: Jan. 31, 2001

(87) PCT Pub. No.: WO00/07761

PCT Pub. Date: Feb. 17, 2000

(30) Foreign Application Priority Data

Jul. 31, 1998 (DE) .......................................... 198 34 635

(51) Int. Cl.[7] .............................................. B23B 51/02
(52) U.S. Cl. .......................... 408/59; 408/227; 408/231; 408/713
(58) Field of Search ........................ 408/59, 713, 230, 408/231, 233, 226, 144

(56) References Cited

U.S. PATENT DOCUMENTS

| | | | | |
|---|---|---|---|---|
| 1,047,466 A | * | 12/1912 | Wagner | 279/86 |
| 2,237,901 A | * | 4/1941 | Chun | 407/40 |
| 2,400,856 A | * | 5/1946 | Thompson | 407/48 |
| 3,776,656 A | * | 12/1973 | Benjamin | 408/233 |
| 4,566,828 A | * | 1/1986 | Reinauer | 407/104 |
| 6,406,226 B2 | * | 6/2002 | Kojima | 408/223 |
| 2001/0026738 A1 | * | 10/2001 | Kojima | 408/227 |

FOREIGN PATENT DOCUMENTS

| | | |
|---|---|---|
| DE | 26 46 528 | 4/1978 |
| DE | 42 39 311 | 5/1994 |
| DE | 44 35 857 | 4/1996 |
| EP | 0 118 806 | 9/1984 |
| EP | 0 625 395 | 11/1994 |

* cited by examiner

*Primary Examiner*—Daniel W. Howell
(74) *Attorney, Agent, or Firm*—Oblon, Spivak, McClelland, Maier & Neustadt, P.C.

(57) ABSTRACT

The invention relates to a boring tool comprising a retaining device which extends in the direction of a longitudinal axis and which comprises a shaft section and a head section. A groove which runs orthogonal in relation to the longitudinal axis and in the direction of a transversal axis is configured in said head section. The boring tool also comprises a cutting insert which is inserted in the groove, and comprises a clamping element. Said clamping element passes through a receiving boring configured in the cutting insert and through a boring configured in at least one of the groove limbs. In addition, the clamping element clamps the cutting insert against the at least one groove limb.

15 Claims, 8 Drawing Sheets

BORING TOOL COMPRISING A REPLACEABLE CUTTING INSERT WHICH IS SECURED AGAINST DETACHING

BACKGROUND ART

The invention relates to a boring tool according to the preamble of claim 1, especially a pointed boring tool, with an exchangeable cutting insert which is secured against loosening.

From European Patent B 0625395 there is known a boring tool of the class in question which is provided with a holder with an axial clamping slit, in which there is inserted a plate-shaped boring cutter as the exchangeable cutting insert in such a way that it bears against the clamping-slit base face. The nonpositive fastening of the boring cutter to the holder is achieved via at least one threaded stud, which is provided with a head and which engages in a bore in at least one of the clamping-slit branches as well as in a bore in the boring cutter. The central axis of the bore in the clamping-slit branch is offset in longitudinal and transverse direction of the boring tool relative to the central axis of the bore in the boring cutter. Furthermore, at least one of two circumferential rims of the threaded stud and boring-cutter bore facing one another is chamfered. In order to permit exact centering of the boring cutter relative to the axis of rotation of the holder, there is inserted, in a bore extending from the clamping-slit base face into the holder, a portion of a centering pin, whose other portion engages in a centering slit in the side of the boring cutter bearing against the clamping-slit base face, in order to center the boring cutter relative to the axis of rotation of the holder. The nominal width of the centering slit is made larger than that of the portion of the centering pin engaging in the centering slit. The direction and size of the offset of the central axes of the bore in the boring cutter and the bore in the clamping-slit branch are also chosen so as to ensure that, in the clamped condition of the threaded stud, only one centering-slit side face bears against one side of the centering pin when the boring cutter is in centered position.

By means of the configuration of the boring tool described in the foregoing it is indeed possible to make the tolerance range of the position of the centering-slit side face bearing against the centering pin as small as desired, but it suffers from the disadvantage of the highly complex manufacturing operations which must be performed to produce the centering slit in the boring cutter in view of the arrangement relative to the bore for receiving the centering pin in the holder. Another apparent disadvantage of the boring tool described hereinabove is that extremely high precision is necessary in machining the clamping slit and making the bore in the clamping-slit base face or the centering slit in the boring cutter in view of the minimal possible play between the boring cutter and the clamping slit. Even with very small tolerances, it is conceivable that, although the boring cutter, by means of the threaded stud, will indeed fit into correct position in the clamping slit immediately after assembly, the boring cutter will not always be able to bear stably against the clamping-slit base face in the desired manner during operation of the boring tool. For example, unwanted gaps may develop between the clamping-slit base face and the side of the boring cutter bearing against the said clamping-slit base face, and these gaps may be further enlarged by the vibrations occurring during operation of the boring tool.

Furthermore, when the boring cutter is in a centered position as described in the foregoing discussion, a centering pin of a cylindrical shape or a square shape in cross section bears against one centering-slit side face of the boring cutter. Aside from the high mechanical stress and strain on the centering pin during clamping of the boring cutter in the clamping slit of the holder by operation of the threaded stud, the centering pin must withstand large dynamic loads during operation of the boring tool. The boring tool is usually exposed to strong vibrations and stresses during its operation, for example due to discontinuous cutting. Under the influence of compressive forces resulting from the stresses and vibrations, deformation in the form of rectangular flattening develops on the centering pin, especially if it has cylindrical geometry, as well as on the side face in question in the clamping slit of the boring cutter. Furthermore, strong bending deformations due to the large compressive forces can be produced in the cylindrical centering pin and also in the centering pin having square cross section, since only a relatively small cross-sectional area can be achieved in the transverse direction of the boring tool, or in other words in the direction of the groove, even in the case of a centering pin with square cross section. Such deformations permit offset, albeit only slight, of the boring cutter in the clamping slit of the holder. This is detrimental to the intended exact and play-free centering of the boring cutter relative to the axis of rotation of the holder. The consequences can include development of inaccurate concentric running of the boring cutter, especially of its point, and thus shortening of the service life of the boring cutter and of the boring tool as a whole.

Aside from the highly complex manufacturing operations, another disadvantage is considered to be equipment complexity, from the viewpoint of compactness of the boring tool and of exact and true positioning of the boring cutter by means of the centering pin in the clamping slit of the holder.

DISCLOSURE OF INVENTION

The object of the invention is therefore to improve the boring tool of the class in question described in the introduction by means of an exchangeable cutting insert which is secured against loosening, such that the cutting insert can be centered and fixed relative to the holder in a manner that is simple from the equipment viewpoint but is nevertheless stable, exact and true.

This object is achieved by the inventive boring tool according to the features of the present invention. Advantageous embodiments of this boring tool are also the subject matter of the present invention.

A boring tool of the class in question with an exchangeable cutting insert as described in the preamble of claim 1 is generally operated at high cutting speeds. To ensure that the vibrations resulting from the high cutting speeds as well as the dynamic stresses and strains caused thereby can be withstood, such a boring tool is usually provided with a relatively large web diameter. The inventive improvement of the boring tool of the class in question now comprises in particular the fact that the cutting insert, which incidentally is preferably made of carbide metal, is provided with an extension which runs in the direction of the longitudinal axis of the boring tool and which reaches into a recess extending from the groove base face in the direction of the longitudinal axis to the shank portion and is pressed against a second stop face, provided in the recess, for fixation of the cutting insert in the direction of the transverse axis. The fact that the web diameter of boring tools of the class in question is generally relatively large is therefore utilized advantageously in the inventive improvement in order to form the recess for receiving the axial extension of the cutting insert. Since adequate space is available by virtue of the relatively large cross section of the boring-tool web, the recess can be formed without substantially reducing the strength and thus the stability of the boring tool.

Centering and fixation of the cutting insert on the holder are therefore accomplished via two stop faces, wherein the first stop face is intended to position the cutting insert primarily in the direction of the longitudinal axis and the second stop face is intended to position the cutting insert primarily in the direction of the transverse axis. By appropriate orientation of the first and second stop faces, for example by forming them as flat faces, each of which lies in a plane that is not normal relative to the longitudinal axis, it is naturally also possible for the first and second stop faces to position the cutting insert both in the direction of the transverse axis and in the direction of the longitudinal axis.

Compared with the conventional boring tool described in the introduction, in which the relatively small-area centering pin performs the function of positioning in the direction of the transverse axis, in the inventive boring tool both the first and also the second stop faces can be formed as relatively large faces, and so relatively large-area bracing of the cutting insert against the holder is possible both in longitudinal direction and in transverse direction. Accordingly, the high static and dynamic loads on the centering pin and boring cutter encountered heretofore in connection with bracing the boring cutter against the centering pin in the direction of the transverse axis can be reduced considerably, whereby any offset, caused by flattening of the centering pin, of the cutting insert in the direction of the transverse axis during the clamping process or during operation of the boring tool can be effectively prevented as a result. The inventive boring tool therefore permits much better concentric running and thereby ensures high quality in the production of bored holes.

The recess which extends from the groove base face to the shank portion into the holder can be made, for example, by boring or milling, the groove itself being made by techniques such as milling. The groove base face therefore has an area which is reduced by the cross-sectional area taken up by the recess. If the groove base face now functions expediently as the first stop face as in the conventional boring tool described in the introduction, the complexity of the manufacturing operations in connection with precision machining of the first stop face is reduced by virtue of the smaller area of the groove base face. In addition, the probability that unwanted gaps will develop between the first stop face and the corresponding side of the cutting insert is considerably reduced. At this stage it must be pointed out that there can function as the first stop face not only the groove base face but also, for example, the recess base face, although the groove base face would be advantageous with regard to stable positioning of the cutting insert in the groove and also with regard to precision machining of the first stop face.

By virtue of the inventive improvement of the boring tool of the class in question, the number of components of the boring tool on the holder, the cutting insert and the clamping element is also reduced. A centering pin for centering the cutting insert relative to the holder is no longer necessary, and so not only the complexity of the manufacturing operations but also the complexity of the equipment is reduced.

Just as is the case for the groove, the second stop face for fixation of the cutting insert in the direction of the transverse axis of the boring tool can be made without problems by techniques such as milling. As regards the complexity of manufacturing operations and also as regards the most intimate possible surface contact with the cutting insert, the first and second stop faces are advantageously formed as plane faces, wherein the first stop face is preferably formed as a plane face normal to the longitudinal axis and, provided the central axis of the receiving bore in the cutting insert is offset relative to the central axis of the bore in the at least one groove branch not only in the direction of the longitudinal axis but also in the direction of the transverse axis, the second stop face is also formed as a plane face normal to the transverse axis. The inventive boring tool, however, is not limited merely to such a configuration of the first and second stop faces. It would also be conceivable to form the first stop face and/or the stop face as a plane face or faces, which is or are aligned in a manner that is not normal to the longitudinal axis or transverse axis. Furthermore, the first stop face and also the second stop face can be formed as curved faces, although thereby the complexity as regards precision machining of these stop faces may be much greater. As regards the most intimate possible surface contact, in which as few unwanted gaps as possible will develop, the side faces provided on the cutting insert or on the extension of the cutting insert in order to be brought into bearing relationship with the first and second stop faces are advantageously complementary to the stop faces provided on the holder.

Good results in the chip-removing machining of high-strength materials can be achieved in particular if the boring tool is provided with at least one flute, which tapers out in the region of one of the tool faces of the cutting insert and merges flush thereinto. If in this case the recess has a cross section whose size is such that the recess merges into the flute, so that a tool such as a face miller can be introduced into the recess in the direction of the transverse axis via the flute, the second stop face, which is provided in the recess and which preferably is formed as a plane face normal to the transverse axis as described hereinabove, can be produced without problems. Accordingly, this configuration of the inventive boring tool proves to be advantageous in that, in contrast to the conventional boring tool described in the introduction, not only the first stop face but also the second stop face as well as the corresponding side faces provided on the cutting insert either as external faces or at least as faces that are readily accessible from outside can be produced or machined without problems in the inventive boring tool. In this way, therefore, all stop faces of the holder and side faces of the cutting insert can be created as plane faces with high surface quality, thus resulting in extremely precise and stable centering of the cutting insert on the holder.

As regards the greatest possible stability of the boring tool on the whole, the clamping element, which preferably is formed as a rotationally symmetric member, advantageously passes not only through the receiving bore formed in the cutting insert but also through a bore extending through both groove branches, in such a manner that the cutting insert is clamped between the two groove branches when the boring tool is in assembled condition. In this case the configuration of the clamping element as a clamping bolt with a head portion, which is inserted in a correspondingly adapted portion of the bore in one of the groove branches, with a shank portion, which passes through the receiving bore in the cutting insert, and with a threaded portion, which engages in a threaded portion of the bore in the other groove branch, offers a configuration of the clamping element that can be manufactured inexpensively and precisely.

Depending on the respective requirements, for example, the offset of the central axis of the receiving bore in the cutting insert relative to the bore extending through both groove branches can be such that the central axis of the receiving bore in the cutting insert is off set, relative to the central axis of the bore extending through both groove branches, in a manner parallel to the direction of the longitudinal axis and to the direction of the transverse axis. It is also possible, however, for the central axis of the receiving bore in the cutting insert and the central axis of the bore extending through both groove branches to lie respectively in one of two parallel planes disposed spaced apart in the direction of the longitudinal axis, wherein the central axis of the receiving bore in the cutting insert, viewed in the direction of the longitudinal axis, intersects the central axis of the bore extending through both groove branches at a particular angle.

The relative arrangement and orientation of the two central axes relative to one another also depends on the geometry of the clamping element and of the receiving bore in the cutting insert. By appropriate geometry of the clamping element and receiving bore in the cutting insert, allowing for the relative arrangement and orientation of the two central axes, it is possible positively to influence the distribution of compressive force exerted on the cutting insert via the clamping element along the inside wall of the receiving bore, and thus to achieve almost torque-free pressing of the cutting insert against the second stop face provided in the recess. If the cutting insert is in this case clamped against the groove branch of the holder by operation of the clamping element, it therefore experiences a clamping force wherein the lines of action of the clamping-force components are directed substantially only toward the first and also the second stop face.

In order to achieve the best possible distribution of pressing force along the inside wall of the receiving bore in the cutting insert, it has proved advantageous when the inclined face is formed by a conical structure of at least portions of the receiving bore in the cutting insert and/or of the clamping bolt. In this case, upon operation of the clamping bolt, the conical face provided in the form of a first wedge face on the one component cooperates with the face provided in the form of a second wedge face on the other component in the manner of a wedge-face mechanism, by which a large force effect (wedge effect) perpendicular to the wedge faces is achieved with a relatively small force, which can be applied by operation of the clamping bolt, in the direction of the central axis of the bore extending through both groove branches (with relatively long travel of the clamping bolt), whereby the cutting insert is pressed (with relatively short travel) against the first and also the second stop face.

To construct such a wedge-face mechanism as was mentioned in the foregoing, it is sufficient in principle if only the receiving bore or the clamping bolt engaging in the receiving bore has a conical structure at least in portions thereof, so that the conical face provided on one of the components (in other words on the clamping bolt or on the receiving bore in the cutting insert) intersects, at an acute angle, known as the wedge angle, the mating face provided on the other component (in other words on the receiving bore in the cutting insert or on the clamping bolt), which mating face could also have cylindrical structure, for example.

Preferably, however, the receiving bore in the cutting insert as one of the wedge faces has a conical inner face and the shank portion of the clamping bolt engaging in the receiving bore as the other wedge face has a conical outer face. Similarly, however, it would also be possible for the receiving bore in the cutting insert as the one wedge face to have a cylindrical inner face and the shank portion of the clamping bolt engaging in the receiving bore as the other wedge face to have a conical outer face.

In order to achieve an optimal stress condition and to apply the clamping force free of torque on the cutting insert, it is further advantageous for the central axis of the bore extending through both groove branches to intersect the longitudinal axis of the boring tool.

For the case that the clamping element is configured as a clamping bolt, which passes through a bore extending through both groove branches, it has further proved advantageous from the viewpoint of making the cutting insert bear with its full surface against the holder for there to be formed, below the base of the recess, a clamping slit extending from the recess base face in longitudinal direction to the shank portion, which slit lies in a first plane, which is turned by a particular angle relative to the plane defined by the transverse axis and the longitudinal axis, and for the central axis of the bore extending through both groove branches to be oriented normal to this first plane. By this feature the side faces of the cutting insert can be made to bear with their full surface against the respective groove side faces, even if the cutting insert is not matched exactly to the groove profile, especially if the side faces of the cutting insert are not exactly plane-parallel relative to the groove side faces. Therewith there is advantageously eliminated any possible cause of vibration, which is almost unavoidable in the prior art, of the cutting insert in the groove during critical machining tasks.

In initial experiments with a prototype, particularly good effects were found when the clamping slit described hereinabove lies in a first plane which is turned by an angle of, for example, between 0° and 30°, preferably 10° relative to the plane defined by the transverse axis and the longitudinal axis. Furthermore, a good clamping effect can be achieved when the ratio of the diameter of the boring tool to the depth extent of the clamping slit from the groove base face in the direction of the shank portion ranges between 2.5 and 6. A ratio of approximately 4 has proved particularly advantageous in this connection.

As a surprising effect in this inventive improvement of a boring tool of the class in question it has been found that, by the clamping slit formed in the holder in addition to the groove and recess, there is achieved, contrary to expectation, instead of the weakening of the boring tool that might initially have been expected compared with a boring tool comprising solid material in the region below the recess base face, an increase of the stability of the boring tool due to the cooperation of the forces and torques achieved by the clamping slit which is clamped together via the clamping bolt, whereby it is additionally ensured that the cutting insert is nonpositively seated over its entire surface in the holder in a manner that is absolutely free of play. At the same time this improvement permits advantageously larger manufacturing tolerances during production of the groove and thus more economic manufacture of the cutting-insert seat, and this is also true analogously for the manufacture of the cutting insert.

In a further advantageous embodiment, the groove, viewed in cross section, has a trapezoidal profile wherein the inside faces of the groove branches are inclined inwardly toward the point of the boring tool at a particular angle of inclination relative to the plane defined by the longitudinal axis and the transverse axis. In this connection the angle of inclination can range between 0° and 5°, although an angle of inclination of about 1.5° is preferred. If the side faces of the cutting insert are simultaneously modified in an analogous manner so that they have the same angle of inclination, this embodiment can, provided the cutting insert can be introduced in the direction of the transverse axis into the groove via the flute mentioned hereinabove, for example, permit easier assembly of the boring tool and thus a reduction of the manufacturing costs, since the cutting insert, after it has been inserted, is secured against falling out in the clamped condition by the trapezoidal groove profile.

As already mentioned, boring tools of the class in question with exchangeable cutting inserts are generally operated at high cutting speeds. In order to be able to withstand the vibrations resulting from the high cutting speeds and the dynamic stresses and strains caused thereby, such boring tools usually have a relatively large web diameter, thus leading to a decrease of the volume of the flute. Although the smaller flute volume results in the disadvantage of poorer removal of chips from the borehole, it can be eliminated, for example, in that chip removal is assisted by means of a coolant and/or lubricant such as a cutting emulsion for cooling and/or lubricating the boring tool, supplied to the boring-tool point under high pressure. The coolant and/or lubricant is preferably supplied via a coolant channel which runs substantially in the direction of the longitudinal axis, emerges at the head portion of the holder and, in the region disposed in the vicinity of the head portion of the holder, splits preferably into two secondary channels, each of which emerges at one end face of the groove branches.

The inventive construction of the boring-point holder is suitable in principle for all common cutting steps and geometries of the boring-tool point. This is primarily due to the fact that the functional faces necessary for fastening the cutting insert are kept as simple as possible. With the inventive fastening geometry, the ratio of the diameter of the boring tool, or in other words the distance between the two end cutting edges, to the dimension of the cutting insert in the direction of the longitudinal axis of the boring tool can be considerably increased, preferably to a range of about 1.5. It has been found that the holding means of the boring-tool point can be used without modification for boring tools which permit bore depths of up to 10×d. The ratio of the diameter of the boring tool to the axial length of a guide portion of the cutting insert is preferably increased to the range around 3.5.

BRIEF DESCRIPTION OF THE DRAWINGS

The inventive boring tool and advantageous or alternative improvements will be explained in more detail on the basis of a preferred practical example and some modifications with reference to the attached drawings, wherein.

BEST MODE FOR CARRYING OUT THE INVENTION

A preferred practical example of inventive boring tool 2 will be described hereinafter with reference to FIGS. 1, 2, 3a, 3b, 4, 5, 6a, 7a, 8a, 8b and 9a.

Inventive boring tool 2 comprises a holder 4, a cutting insert 6 and a clamping bolt 8 for fastening cutting insert 6 on holder 4. These components will be described in detail hereinafter.

Figure 1:
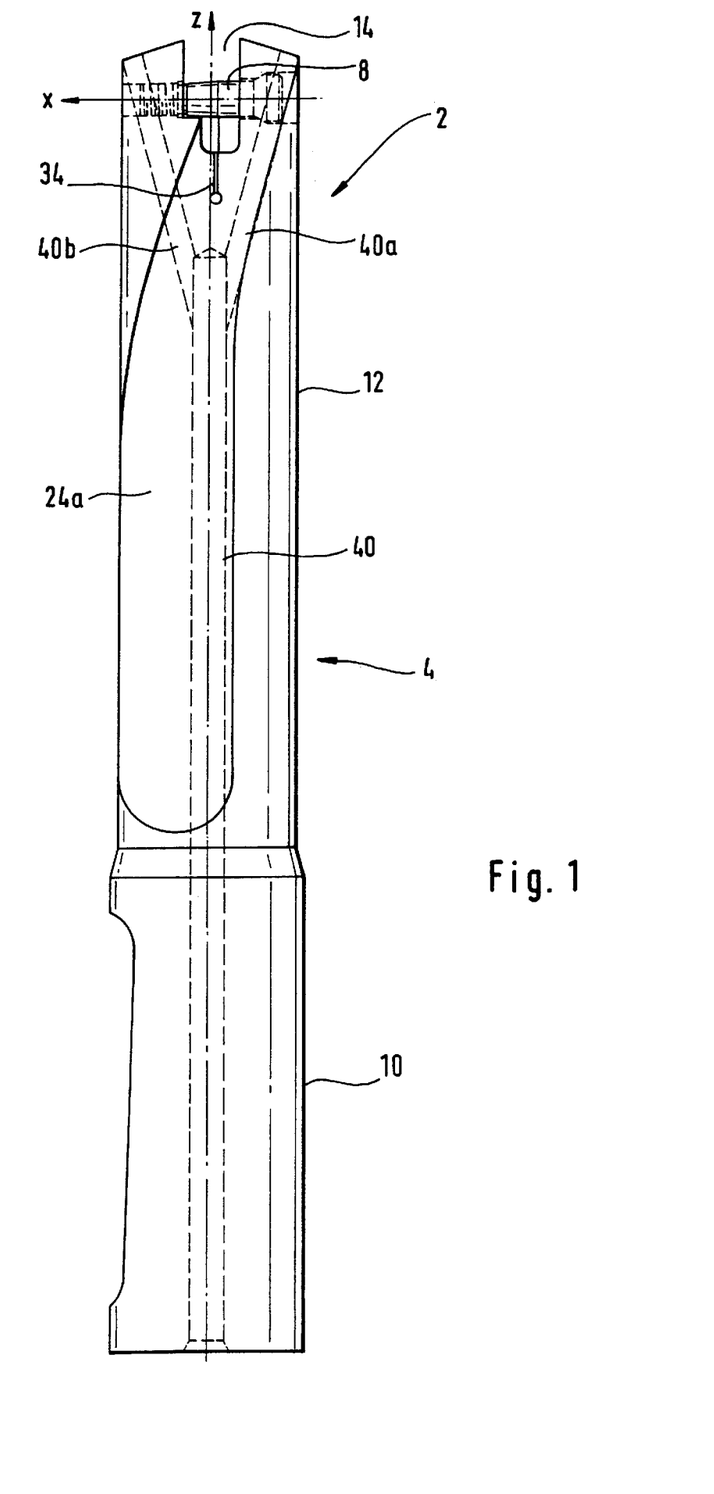
FIG. 1 shows a side view of a holder of the inventive boring tool.
Figure 2:
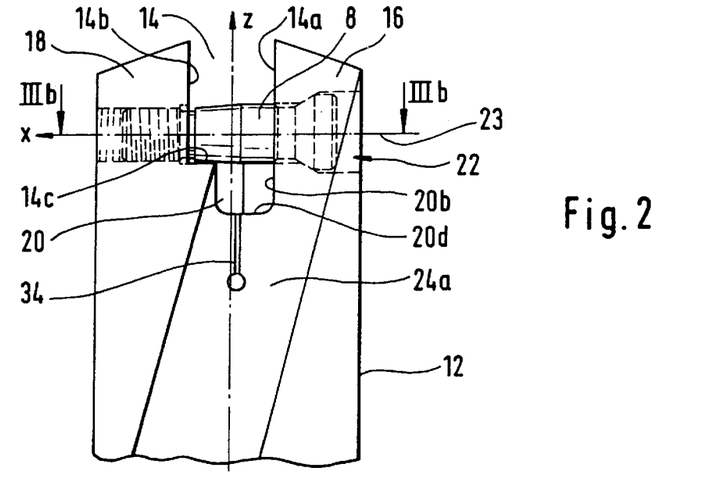
FIG. 2 shows an enlarged side view of the head portion of the holder illustrated in FIG. 1.
Figure 3A:
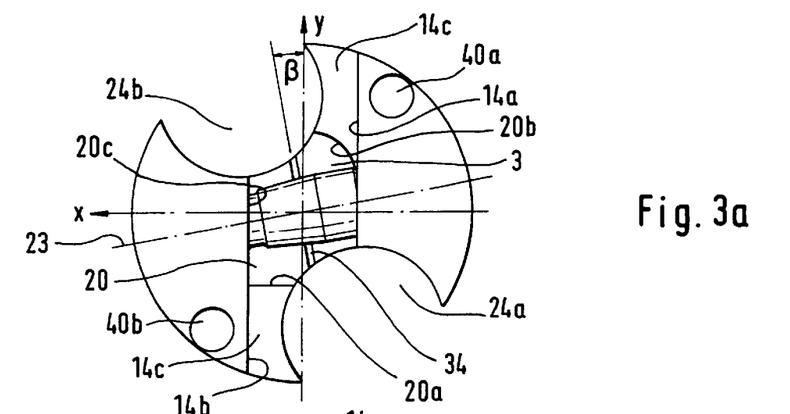
FIG. 3a shows a frontal top view of the head portion of the holder illustrated in FIGS. 1 and 2.

According to the diagram in FIGS. 1, 2 and 3a, holder 4 of inventive boring tool 2 is of substantially cylindrical shape and has an axis of rotation or longitudinal axis z and transverse axes x and y oriented perpendicular thereto. Holder 4 is subdivided into a shank portion 10, via which boring tool 2 can be clamped in a tool mount, which is not illustrated, and a head portion 12 for fastening cutting insert 6.

For this purpose, as is evident in particular from the diagram in FIGS. 1, 2 and 3a, there is formed, by milling, for example, on the free end of head portion 12 remote from shank portion 10, a groove 14 running diametrically in the direction of transverse axis y through head portion 12 and opening toward the boring-tool point. Groove 14 is bounded by groove side faces 14a, 14b, which also form the inside faces of groove branches 16, 18, as well as by a groove base face 14c. In this practical example, groove side faces 14a and 14b are formed as plane faces, which are disposed parallel to the plane Ezy defined by longitudinal axis z and transverse axis y, on opposite sides respectively of plane Ezy and at equal distances therefrom. In this practical example, groove base face 14c is also formed as a plane face, but is aligned normal to the plane defined by longitudinal axis z and transverse axis y, or in other words parallel to plane Exy defined by transverse axes x and y. Groove side faces 14a, 14b are therefore disposed at right angles to groove base face 14c and are aligned in the direction of transverse axis y. In this practical example, groove base face 14c also functions as the first stop face on which cutting insert 6, to be described in more detail hereinafter, is seated in the assembled condition of boring tool 2, as can be seen in particular in FIG. 8a.

Reference symbols 24a and 24b denote flutes, which extend helically around the external circumference of head portion 12 of holder 4 in the direction of longitudinal axis z to the boring-tool point, and emerge at the end faces at the free end of head portion 12 of holder 4.

According to the diagram in FIGS. 1, 2, 3a and 3b, a recess 20, which may be milled out, for example, adjoins groove 14 and extends from groove base face 14c, parallel to longitudinal axis z, into head portion 12 of holder 4. As already mentioned in the introduction, inventive boring tool 2 has a relatively large web diameter, and so the formation of recess 20 in web 3 of boring tool 2 does not cause any substantial impairment of strength and stability.

Figure 3B:
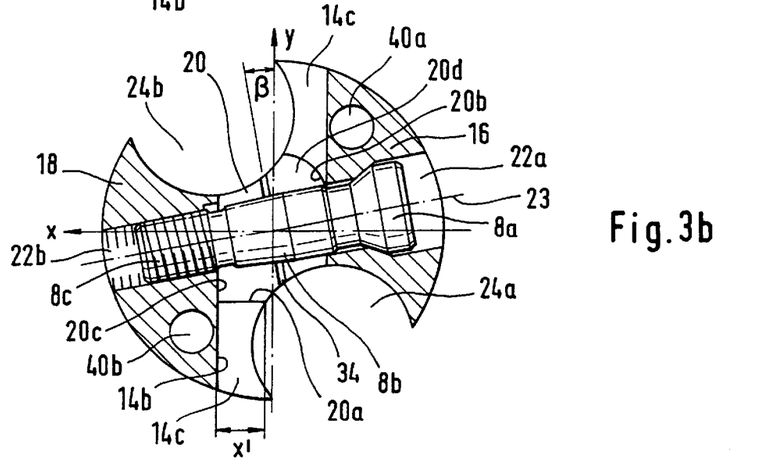
FIG. 3b shows a sectional view of the head portion of the holder illustrated in FIGS. 1 and 2 along a line IIIb—IIIb in FIG. 2.

Referring now to FIGS. 3a and 3b, there is provided in recess 20 second stop face 20a, against which cutting insert 6 bears in assembled condition of boring tool 2. Recess 20 is bounded by recess side faces 20b, 20c as well as a recess base face 20d. In common with groove base face 14c, recess base face 20d can be formed as a plane face normal to longitudinal axis z. Recess side faces 20b, 20c merge in a substantially flush manner into groove side faces 14a, 14b in the region thereof. In this practical example, second stop face 20a is formed as a plane face normal to transverse axis y and intersecting recess side face 20c at right angles, whereby dimensions x' (see FIG. 3b) is maximal from second stop face 20a in the direction of transverse axis x, as is evident from FIG. 3b.

Relative to longitudinal axis z, recess 20 has a cross-sectional area which opens into the cross-sectional areas of flutes 24a, 24b. This configuration creates the advantage that a milling tool, for example, can be introduced via flute 24b parallel to transverse axis y into recess 20, in order to establish at the inside face 20b of recess 20 second stop face 20a, against which cutting insert 6 bears in assembled condition of boring tool 2. According to the diagram in FIGS. 8a and 8b, recess 20 has a depth T, measured from groove base face 14c, which is larger than length L of extension 7 of cutting insert 6 running in the direction of longitudinal axis z, thus ensuring that cutting insert 6 in the assembled condition of boring tool 2 is seated on first stop face 14c and does not touch recess base face 20c.

In this practical example, first stop face 14c and second stop face 20a are therefore formed either by external faces or at least faces that are readily accessible from outside, which faces can therefore be produced or machined without problems. First stop face 14c and also second stop face 20a therefore have high surface quality; this results in extremely precise and stable centering of cutting insert 6 on holder 4.

Figure 7A:
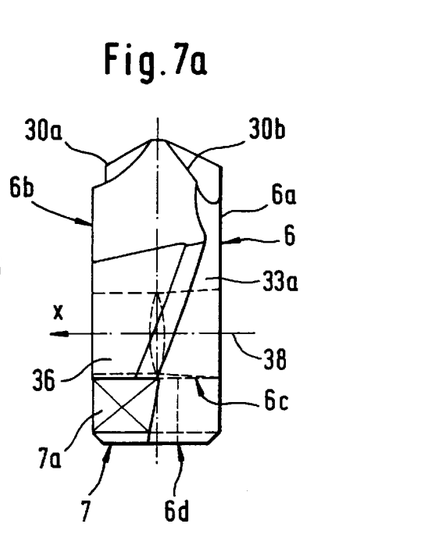
FIG. 7a shows a side view of the inventive cutting insert according to FIG. 4 in the direction of the transverse axis.
Figure 8A:
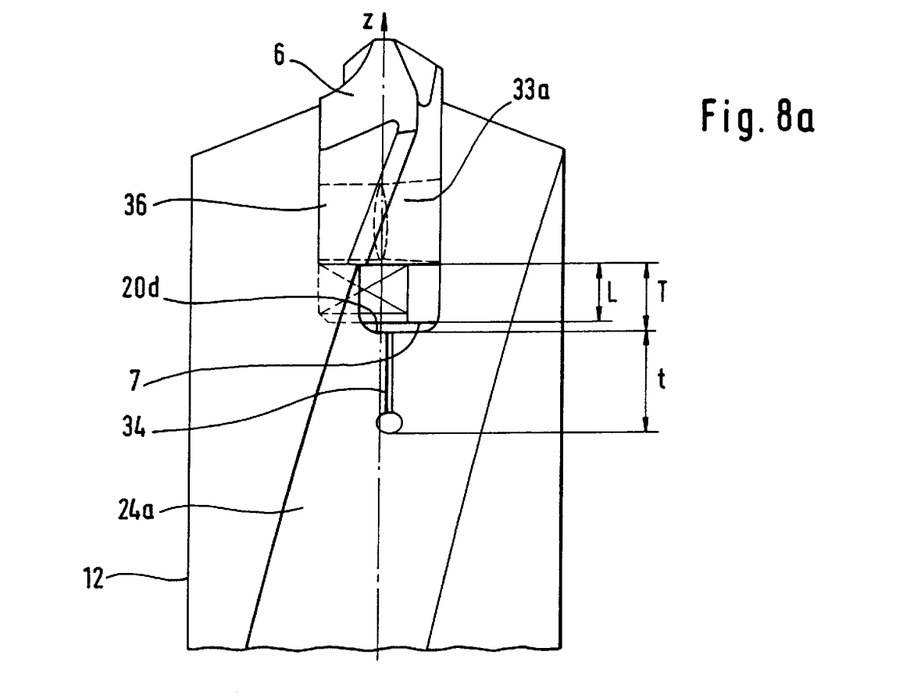
FIG. 8a shows a side view of the head portion of the holder illustrated in FIG. 1 with inserted cutting insert.

Adjoining recess 20 there is additionally formed in the direction of shank portion 10 a clamping slit 34 which passes diametrically through head portion 12 and which is disposed in a plane turned counterclockwise around longitudinal axis z by an angle β ranging between 0° and 15°, preferably about 10°, relative to the plane defined by transverse axis y and longitudinal axis z. By virtue of clamping slit 34 and the cooperation that it causes between the clamping forces acting on cutting insert 6 even if cutting insert 6 is not matched exactly to the groove profile, especially in the case that side faces 6a, 6b of cutting insert 6, as shown in FIG. 7a, are not exactly plane-parallel relative to side faces 14a and 14b, side faces 6a and 6b of cutting insert 6 can be made to bear with their full surface against groove side faces 14a and 14b respectively during assembly of boring tool 2. The ratio between diameter D of boring tool 2 indicated in FIG. 9a and depth t by which clamping slit 34 extends from groove base face 14c in the direction of shank portion 10, as indicated in FIG. 8a, ranges between 1.5 and 3, preferably about 2.25. A good clamping effect is achieved with such a ratio.

Above groove base face 14c there extends a bore 22, whose central axis 23 lies in a plane normal to longitudinal axis z, which bore passes through both groove branches 16 and 18 and is aligned transverse to clamping slit 20, or in other words normal to the plane of clamping slit 34. Through bore 22 there is passed clamping bolt 8, which functions as the clamping element, as is evident for example from FIG. 3b. Bore 22 comprises bore portion 22a formed in groove branch 16 in order to receive a head portion 8a of clamping bolt 8, as well as a bore portion 22b formed in groove branch 18 with internal thread in order to receive an externally threaded portion 8c of clamping bolt 8.

As is shown in FIG. 3b, clamping bolt 8 comprises head portion 8a, which is inserted in correspondingly adapted portion 22a of bore 22 in groove branch 16, externally threaded portion 8c, which is engaged in internally threaded bore portion 22b of bore 22 in groove branch 18, and a shank portion 8c, which extends between head portion 8a and externally threaded portion 8b, and which is inserted in a receiving bore 36 (see FIG. 4) of cutting insert 6, to be described hereinafter. The shank portion has an external circumferential face that tapers from head portion 8a to threaded portion 8b, or in other words is conical, as is evident for example from FIG. 9a.

In FIGS. 4, 5, 6a and 7a there is illustrated cutting insert 6 to be inserted in groove 14 of head portion 12 of holder 4. The outside dimensions of cutting insert 6 are chosen to ensure among other aspects that in the assembled condition of boring tool 2 according to FIGS. 8a and 8b it protrudes beyond the free end of head portion 12 in the direction of longitudinal axis z as well as in the direction of transverse axis y. As already mentioned hereinabove, cutting insert 6 is provided with extension 7, which in the assembled condition reaches into recess 20 toward shank portion 10, and which according to the diagram in FIG. 6a has a substantially rectangular cross section, which has on the whole a relatively large area, especially by virtue of a relatively large dimension in the direction of transverse axis y. On this extension 7 there is formed, normal to transverse axis y, a plane face 7a, via which cutting insert 6 in the assembled condition of boring tool 2 bears against second stop face 20a, as already mentioned hereinabove. This structural feature ultimately defines the positional orientation of cutting insert 6 in groove 14 of head portion 12. In this practical example, therefore, turning of cutting insert 6 by 180° around longitudinal axis z is not possible.

As shown in FIGS. 4, 5, 6a and 7a, cutting insert 6 has side cutting edges 30a, 30b, which include an obtuse angle, end cutting edges 32a, 32b as well as tool faces 33a, 33b. As is shown for example in FIGS. 8a and 9a, flutes 24a, 24b formed in holder 4 each taper out in the region of one of the two tool faces 33a, 33b respectively and merge thereinto. Cutting insert 6 is further bounded by aforementioned side faces 6a and 6b, via which cutting insert 6 bears against groove side faces 14a, 14b respectively and each of which merges into the side faces of extension 7, by a face 6c which actually comprises two secondary faces and via which cutting insert 6 bears against first stop face 14c, and by a lower face 6d, which in the assembled condition is disposed at a distance from recess base face 20d. Side faces 6a, 6b, face 6c and side face 7a, which in this practical example form functional faces, are complementary to the respective mating faces, or in other words groove side faces 14a, 14b, groove base face 14c and second stop face 20a respectively, in order to bear there against over the largest possible surface in the most stable possible relationship. In other words, they are formed as plane faces normal to the longitudinal axis or to the transverse axis as the case may be. On cutting insert 6 there is further formed a receiving bore 36 with an internal circumferential face that in the assembled condition of boring tool 2 tapers conically from bore portion 22a in groove branch 16 toward bore portion 22b in groove branch 18.

Figure 8B:
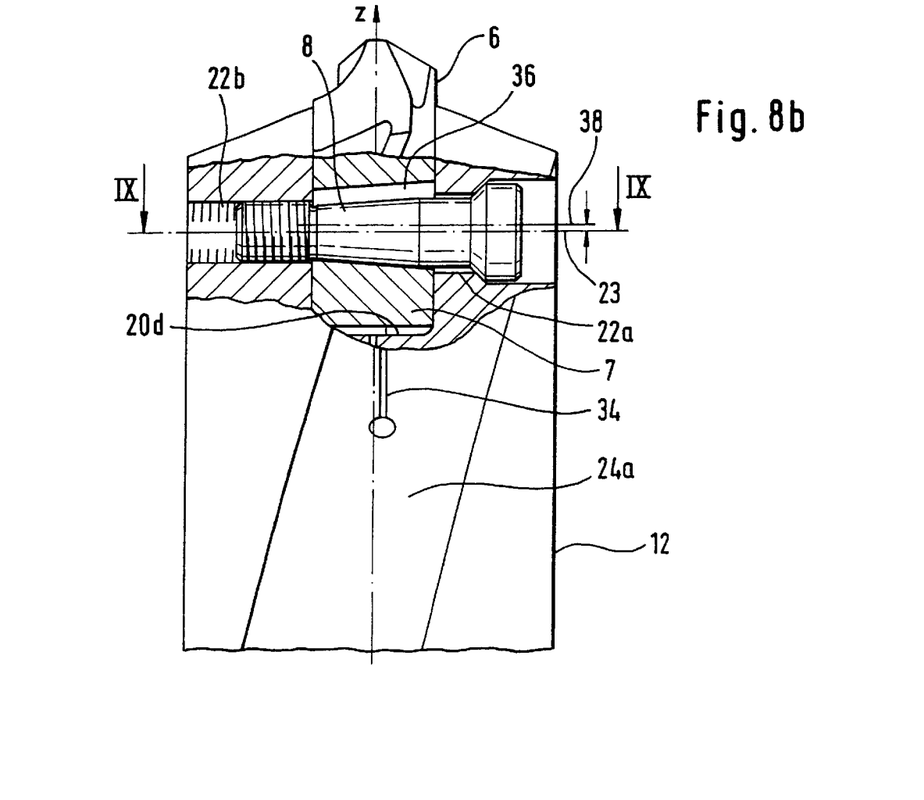
FIG. 8b shows a partial sectional view of the head portion of the holder illustrated in FIG. 8a with inserted cutting insert along a line VIII—VIII in FIG. 9a, FIG. 9a shows a sectional view of the head portion of the boring tool illustrated in FIGS. 8a and 8b along line IX—IX in FIG. 8b.
Figure 9A:
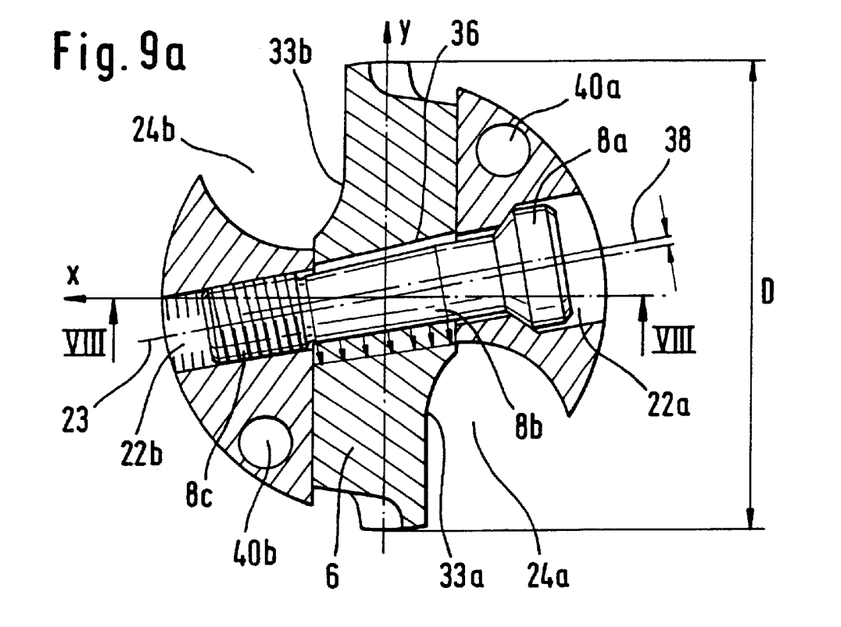

As is evident from FIGS. 8b and 9a, the rotationally symmetric external circumferential face of shank portion 8b of clamping bolt 8 has the same conicity as the internal circumferential face of receiving bore 36, but is smaller in diameter than receiving bore 36. Central axis 38 of receiving bore 36 in cutting insert 6 is oriented in the same direction as central axis 23 of bore 22, which extends through both groove branches 16, 18. It is further evident from the diagrams in FIGS. 8b and 9a that central axis 38 of receiving bore 36 is offset, relative to central axis 23 of bore 22 extending through both groove branches 16, 18, in a manner parallel both to the direction of transverse axis y and to the direction of longitudinal axis z.

The conical external circumferential face of shank portion 8b and the equally conical internal circumferential face of receiving bore 36 of cutting insert 6 each form one of two wedge faces of a "wedge-face mechanism", by which a large force effect (wedge effect) perpendicular to the two wedge faces is achieved with a relatively small force, which can be applied by operation of clamping bolt 8, in the direction of central axis 23 of bore 22 extending through both groove branches 16, 18 (with relatively long travel of clamping bolt 8), whereby cutting insert 6 experiences (with relatively short travel) a compressive force in the direction of longitudinal axis z and also in the direction of transverse axis y. During assembly of cutting insert 6 on holder 4, the two central axes 38 and 23 of receiving bore 36 and bore 22 respectively move toward one another; by virtue of the different diameters of receiving bore 36 and of bore 22, however, they do not come into coincidence.

When clamping bolt 8 is operated, shank portion 8b accordingly acts through the wedge-face mechanism to exert on cutting insert 6 a first compressive-force component toward first stop face 14c and a second compressive-force component toward second stop face 20a, whereby cutting insert 6 is firmly urged both in the direction of longitudinal axis z and also in the direction of transverse axis y toward first and also second stop face 14c, 20a.

Therewith the cutting insert is secured against vibrations during operation of the boring tool. For this purpose the direction and size of the offset of central axes 23 and 38 are chosen in particular to ensure that in the assembled condition of boring tool 2 the external circumferential face region of shank portion 8b of clamping bolt 8b facing first and second stop faces 14c, 20a bears tightly against the oppositely disposed internal circumferential face region of receiving bore 36 of cutting insert 6, as can be seen in the diagrams of FIGS. 8b and 9a.

The distribution of compressive force exerted via the external circumferential face of shank portion 8b on the internal circumferential face of receiving bore 36 of cutting insert 6 during operation of head unbolt 8 is ultimately also determined by the length of contact of the external circumferential face of shank portion 8b of clamping bolt 8 and of the internal circumferential face of receiving bore 36 in cutting insert 6 in the direction of transverse axis x. Since in this practical example the length of the external circumferential face of shank portion 8b of clamping bolt 8 corresponds substantially to the length of the internal circumferential face of receiving bore 36 in the cutting insert, as is evident from FIG. 9a, cutting insert 6 is subjected to the compressive force substantially over the entire length of the internal circumferential face of receiving bore 36, and so cutting insert 6 experiences the resulting line of action of compressive force in the direction of transverse axis x approximately on half the length of contact of the external circumferential face of shank portion 8b of clamping bolt 8 and of the internal circumferential face of receiving bore 36 in cutting insert 6.

When clamping bolt 8 is operated, cutting insert 6 therefore experiences a compressive force whose line of action is directed toward first and second stop faces 14c, 20a. Simultaneously, cutting insert 6 is pressed against groove branches 16, 18 as the clamping-slit side faces approach one another. In the process head portion 12, especially groove branches 16, 18, experiences an elastic deformation, which causes a stress condition that, even in the case of occurrence of strong vibration of boring tool 2, leads to high stability and reliable fixation of cutting insert 6 on holder 4.

As already mentioned, centering and fixation of cutting insert 6 in groove 14 formed in head portion 12 is achieved via first stop face 14c and second stop face 20a, first stop face 14c positioning cutting insert 6 in the direction of longitudinal axis z and second stop face 20a positioning cutting insert 6 in the direction of transverse axis y. Because on the one hand cutting insert 6 is braced over a relatively large surface against the two stop faces 14c and 20a and on the other hand extension 7 has relatively large cross-sectional area, especially in the direction of transverse axis y, deformation-related offset of cutting insert 6 in the direction of transverse axis y, caused by compressive stress and strain of extension 7 during operation of boring tool 2, can be effectively prevented.

The outside dimensions of cutting insert 6 and also of extension 7 are naturally matched to the respective dimensions of groove 14 formed in head portion 12 and also of recess 20, in order to ensure that there can be achieved a clamped condition such as is evident from the figures. As regards adequate stability of boring tool 2, one critical aspect among others is that, in the assembled condition of boring tool 2, side faces 6a, 6b of cutting insert 6 must bear completely, or in other words without gaps if at all possible, against groove side faces 14a, 14b respectively. For this purpose it is advantageous for the width of clamping slit 34 perpendicular to transverse axis y to be chosen such that, even in the assembled condition of boring tool 2, clamping slit 34 is not closed, or in other words the clamping-slit side faces do not touch one another. Furthermore, the offset of central axis 23 of bore 22 relative to central axis 38 of receiving bore 36 must be chosen to be so large that, in the assembled condition of boring tool 2 the clamping forces acting on the cutting insert are so large that faces 7a and 6c provided on the cutting insert bear completely against second stop face 20a or against first stop face 14c respectively.

As FIGS. 1, 3a, 3b and 9a show, there is also formed in holder 4 a cooling and/or lubricant channel 40, which in the upper region of head portion 12 of holder 4 splits into two secondary channels 40a and 40b. Each of the two secondary channels 40a and 40b emerges at the end face of the free end of head portion 12 of holder 4. As already mentioned, boring tools of the class in question with exchangeable cutting inserts are generally operated at high speeds. In order to be able to withstand the vibrations resulting from the high cutting speeds and the dynamic stresses and strains caused thereby, such boring tools usually have relatively large web diameter, thus leading to a decrease of the volume of the flute. Although the smaller flute volume results in the disadvantage of poorer removal of chips from the borehole, it can be compensated in inventive boring tool 2 in that chip removal is assisted by means of a coolant and/or lubricant such as a cutting emulsion for cooling and/or lubricating boring tool 2, supplied to the boring-tool point under high pressure.

Obviously deviations from the practical example described hereinabove are possible without departing from the basic ideas of the invention.

Figure 3C:
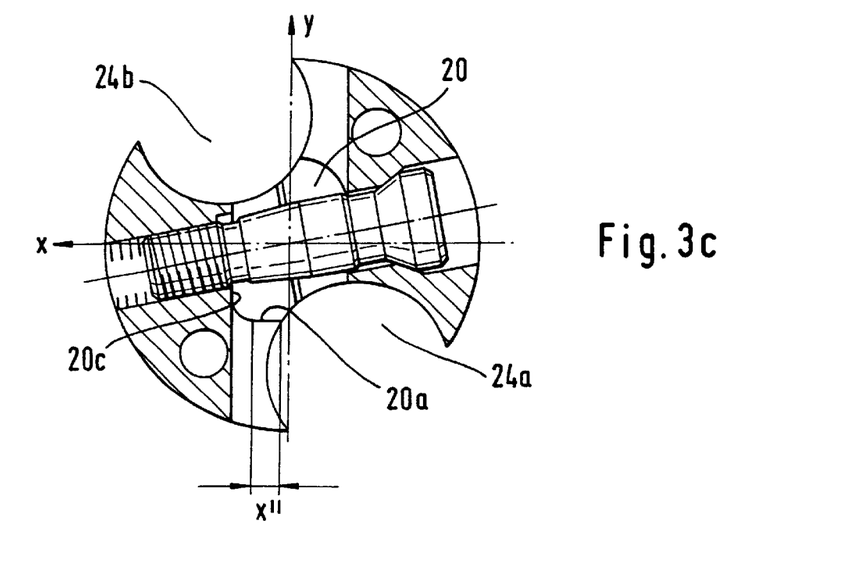
FIG. 3c shows a sectional view of a modified head portion of the holder illustrated in FIGS. 1 and 2 along line IIIb—IIIb in FIG. 2.
Figure 4:
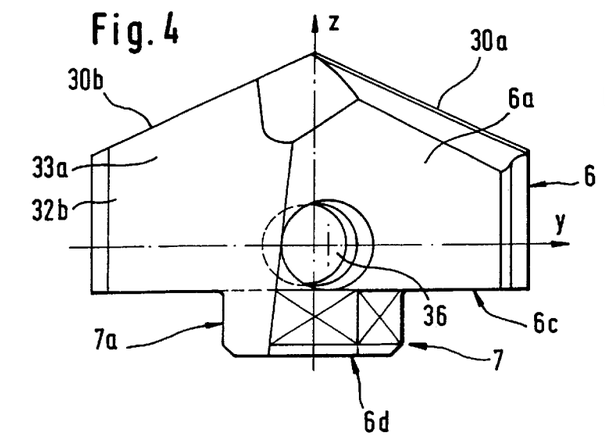
FIG. 4 shows a side view of the inventive cutting insert.
Figure 5:
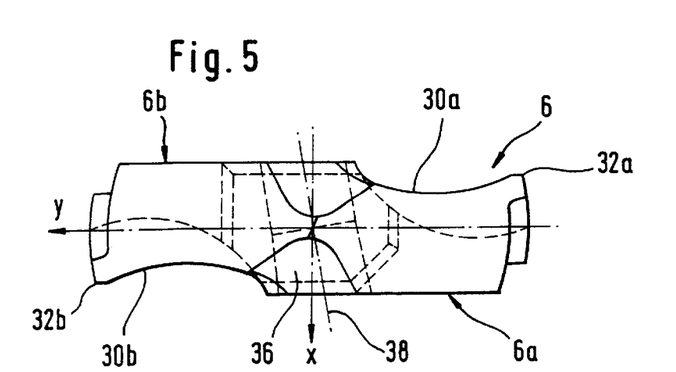
FIG. 5 shows a top view of the inventive cutting insert according to FIG. 4.
Figure 6A:
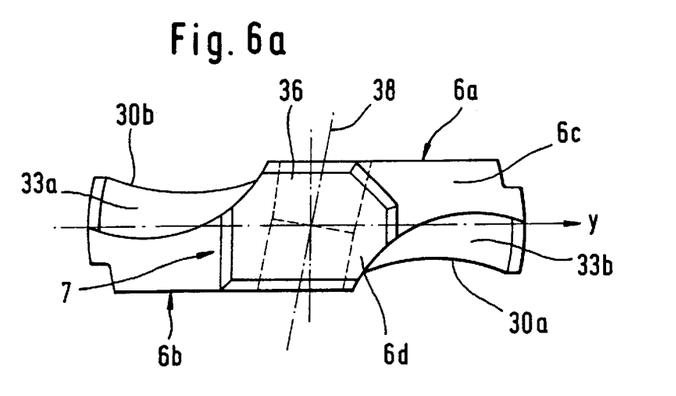
FIG. 6a shows a bottom view of the inventive cutting insert according to FIG. 4.
Figure 6B:
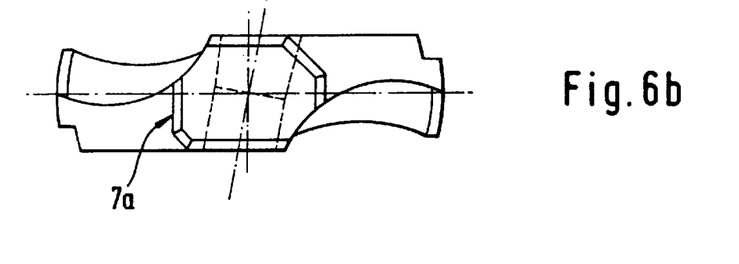
FIG. 6b shows a bottom view of a modified cutting insert.
Figure 7B:
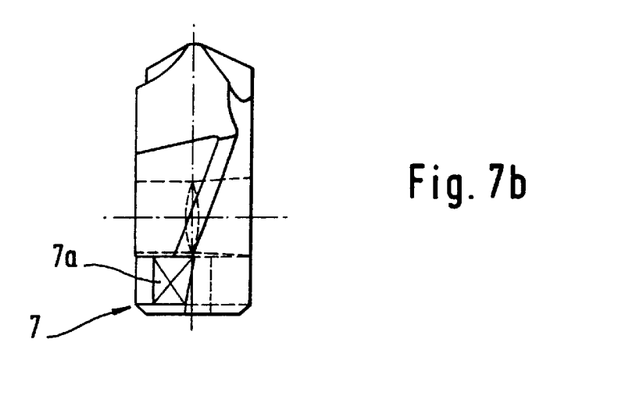
FIG. 7b shows a side view of a modified of the cutting insert according to FIG. 6a in the direction of the transverse axis.

FIGS. 3c, 6b and 7b show a modification of the practical example of inventive boring tool 2 described hereinabove in relation to second stop face 20a, which is provided in recess 20, and to plane face 7a, which is provided on extension 7 of cutting insert 6 and which in assembled condition of boring tool 2 bears against second stop face 20a. In this modification, second stop face 20a merges into recess base face 20b via a rounded transition, whose diameter corresponds, for example, to the diameter of a milling tool introduced in a direction parallel to longitudinal axis z. Compared with the practical example shown in FIG. 3b, second stop face 20a in the modification has smaller dimension in a direction normal to the plane defined by longitudinal axis z and transverse axis y, as is indicated with x" in FIG. 3c. Plane face 7a formed on extension 7 of cutting insert 6 is accordingly adapted to second stop face 20a, as can be seen from FIGS. 6b and 7b. By this feature there can be achieved a considerable reduction in the technical complexity in connection with precision machining of the respective face portions in the corner region at the line of intersection of second stop face 20a with recess side face 20b, without making second stop face 20a substantially smaller as a result. Even if the cross-sectional area of recess 20 or the cross-sectional areas of flutes 24a, 24b are chosen such that access to recess 20 via flute 24b parallel to transverse axis 24 is no longer possible, second stop face 20a can nevertheless be made without problems and with high accuracy in this case, since the face portions in the corner region at the line of intersection of second stop face 20a with recess side face 20c, which portions generally cause difficulties for introduction of a milling tool parallel to longitudinal axis z, for example, do not have to be precisely machined.

Figure 9B:
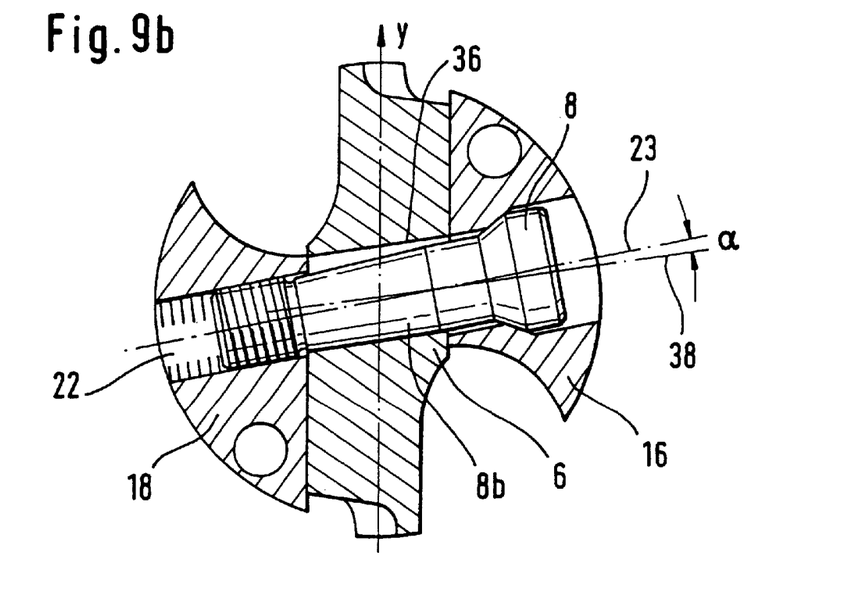
FIG. 9b shows a sectional view of a modified head portion and cutting insert of the boring tool illustrated in FIGS. 8a and 8b along line IX—IX in FIG. 8b.
Figure 9C:
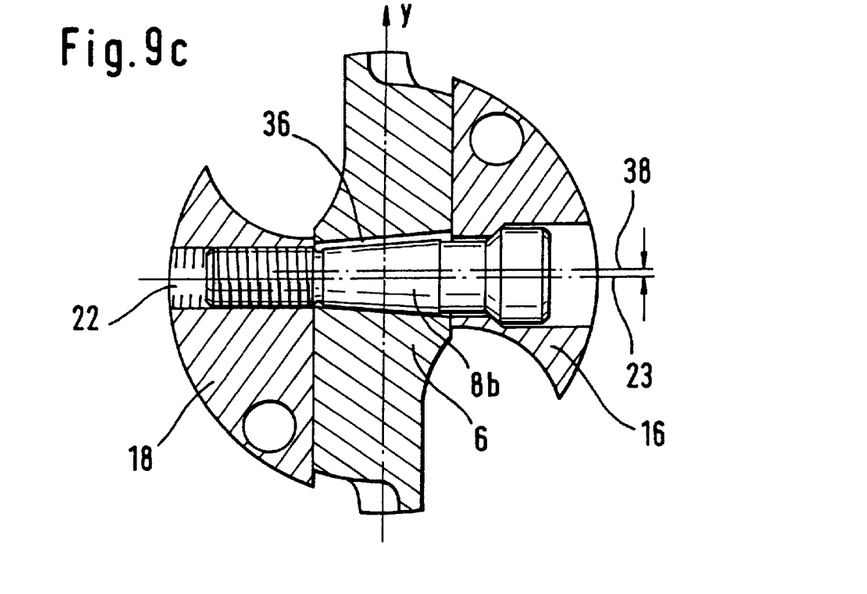
FIG. 9c shows a sectional view of a modified head portion and cutting insert of the boring tool illustrated in FIGS. 8a and 8b along line IX—IX in FIG. 8b.

FIGS. 9b and 9c show further modifications as regards the configuration of receiving bore 36 in cutting insert 6 and as regards the alignment relative to one another of central axis 38 of receiving bore 36 in cutting insert 6 and central axis 23 of bore 22 in the two groove branches 16, 18.

Whereas the rotationally symmetric external circumferential face of shank portion 8b of clamping bolt 8 and also the internal circumferential face of receiving bore 36 have a conical shape in the practical example described hereinabove with reference to the diagram in FIGS. 8b and 9a, only the external circumferential face of shank portion 8b of clamping bolt 8 has a conical shape according to the diagram in FIG. 9b. In contrast, the internal circumferential face of receiving bore 36 in cutting insert 6 is formed as a cylindrical through bore. Central axis 38 of receiving bore 36 in cutting insert 6, viewed in the direction of longitudinal axis z, therefore intersects central axis 23 of bore 22 extending through the two groove branches 16, 18 at an acute angle a. Nevertheless, central axis 38 of receiving bore 36 in cutting insert 6 and central axis 23 of bore 22 extending through the two groove branches 16, 18 each lie in one of two parallel planes disposed spaced apart in the direction of longitudinal axis z, as in the foregoing practical example.

A further modification will be made clear with reference to the diagram in FIG. 9c. In this case central axis 38 of receiving bore 36 in cutting insert 6 is offset, relative to central axis 23 of bore 22 extending through the two branches 16, 18, in a manner parallel both to the direction of transverse axis y and to the direction of longitudinal axis z. In contrast to the practical example described hereinabove, in which central axes 23 and 38 of bore 22 and of receiving bore 36 respectively are oriented at an angle $\alpha$ on the plane defined by longitudinal axis z and transverse axis y, as is shown in FIG. 3b, the plane defined by longitudinal axis z and transverse axis y in the present modification forms a normal plane relative to central axes 23 and 38 of bore 22 and receiving bore 36 respectively, as can be seen from the diagram in FIG. 9c. In this case clamping slit 34 expediently lies in the plane defined by longitudinal axis z and transverse axis y or parallel thereto.

Figure 9D:
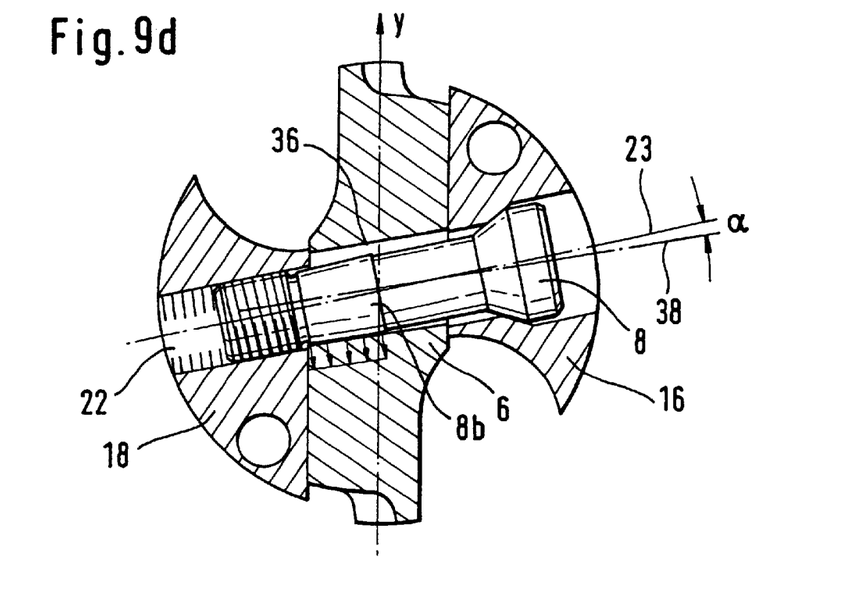
FIG. 9d shows a sectional view of a modified head portion and cutting insert of the boring tool illustrated in FIGS. 8a and 8b as taken along line IX—IX in FIG. 8b.

In order to displace the line of action of the compressive force resulting from the distribution of compressive force on the internal circumferential face of receiving bore 36 in cutting insert 6 more toward first and second stop faces 14c and 20a, it is advantageous to divide shank portion 8b of clamping bolt 8 into two regions, wherein the region of shank portion 8b adjoining head portion 8a has cylindrical shape, for example, and the region of shank portion 8b adjoining externally threaded portion 8c has conical shape. By matching the length of the conical region of shank portion 8b adjoining externally threaded portion 8c appropriately in the direction of transverse axis x to the length of second stop face 20a in the direction of transverse axis x, it can be ensured in this case that the compressive force is concentrated only over that region of the internal circumferential face of receiving bore 36 in cutting insert 6 in the direction of transverse axis x which, in relation to transverse axis x, lies at the height of first and second stop faces 14c and 20a. By such a configuration of clamping bolt 8, therefore, it is possible to displace the line of action of the compressive force into the region of first and second stop faces 14c and 20a, whereby cutting insert 6 in the assembled condition of boring tool 2 is pressed against first and second stop faces 14c and 20a in a manner substantially free of torque. This is illustrated in FIG. 9d.

Figure 10:
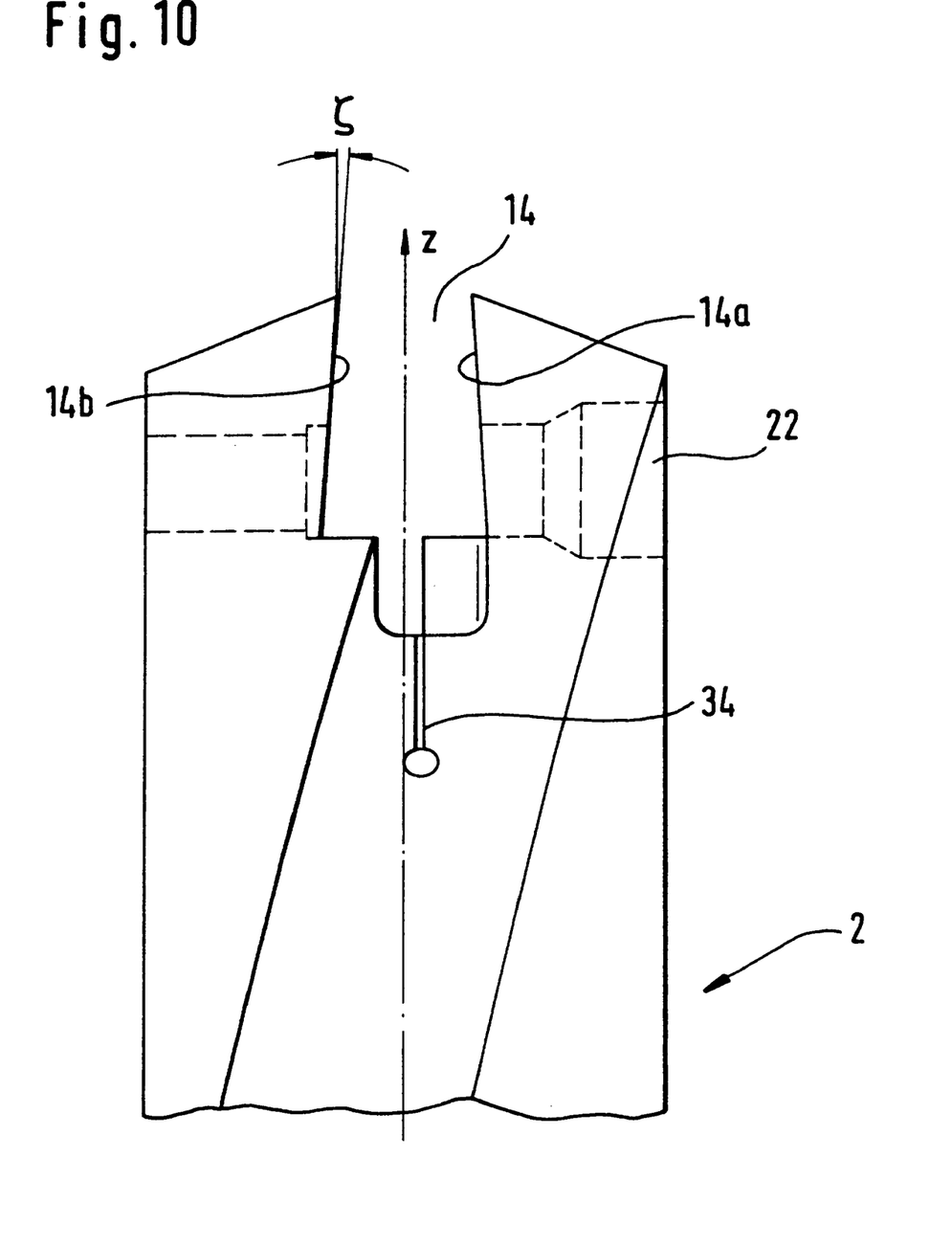
FIG. 10 shows an enlarged side view of a modified head portion of the holder illustrated in FIGS. 1 and 2.

In FIG. 10 there is illustrated a modification of the boring-tool point of inventive boring tool 2 illustrated in FIG. 1. Groove 14 in this case has a trapezoidal shape; in other words, groove side faces 14a, 14b are inclined inwardly toward the boring-tool point at an inclination angle $\zeta$. Furthermore, clamping slit 34 and bore 22 for receiving clamping bolt 8 are also shown here. To simplify manufacture, inclination angle $\zeta$ of groove side faces 14a, 14b will be allocated a positive tolerance and the inclination angle of corresponding side faces 6a, 6b of cutting insert 6, which are not illustrated, will be allocated a negative tolerance. Depending on configuration, inclination angle $\zeta$ can range between 0° and 5°, an inclination angle $\zeta$ of 1.5° being chosen preferably. Naturally the modification of the cross section of groove 14 from a rectangular profile to a trapezoidal profile makes sense only if cutting insert 6 and groove 14 or recess 20 are matched sufficiently to one another in terms of size that cutting insert 6 can be introduced parallel to longitudinal axis z or parallel to transverse axis y. In this case easier assembly of the boring tool and thus a reduction of manufacturing costs can be achieved by giving groove 14 a trapezoidal profile while at the same time modifying cutting insert 6 in analogous manner, since cutting insert 6, after it has been inserted, is secured against falling out in the assembled condition of boring tool 2 by the trapezoidal groove profile.

Inventive boring tool 2 with an exchangeable cutting insert 6 secured against loosening can be manufactured by simple production operations. In this connection, cutting insert 6 causes less weakening of the boring-tool point of holder 4 than in boring-tool designs known heretofore, thus making it more stable as a result. A change of cutting insert 6 can be performed quickly and simply.

As materials for the cutting insert there can also be used, in addition to carbide metal, ceramic and cermet materials. The cutting plate can be designed as a ground plate or also merely as a sintered plate, which is therefore less expensive. The scope of application encompasses bore depths up to 10 times the bore diameter.

As the foregoing description shows, diverse modifications or variations of the illustrated embodiment are possible without departing from the context of the invention.

Obviously the features of the practical example described hereinabove and the features of the modifications can be combined in various ways if these are technically feasible and appear to be expedient.

The invention therefore provides a boring tool with a holder which extends in the direction of a longitudinal axis and which has a shank portion and a head portion, in which there is formed a groove running in the direction of a transverse axis orthogonal to the longitudinal axis, with a cutting insert inserted in the groove and with a clamping element, which passes through a receiving bore formed in the cutting insert and a bore formed in at least one of the groove branches, and which clamps the cutting insert against the at least one groove branch. The central axis of the bore in the at least one groove branch is offset relative to the central axis of the receiving bore in the cutting insert. The clamping element and the cutting insert form a group of components, one component of which cooperates via an inclined face with the other component in the manner of a wedge-face mechanism in such a way that the cutting insert in assembled condition of the boring tool is pressed in the direction of the longitudinal axis against a first stop face and in the direction of the transverse axis against a second stop face. The inventive boring tool is characterized in that the cutting insert is provided with an extension which runs in the direction of the longitudinal axis and which reaches into a recess which extends from the groove base face in the direction of the longitudinal axis to the shank portion, and in which there is provided the second stop face.

I claim:

1. A boring tool comprising:
   a holder which extends in the direction of a longitudinal axis and which has a holder shank portion and a head portion, in which there is formed a groove running in the direction of a transverse axis orthogonal to the longitudinal axis so as to form first and second groove branches on the head portion,
   a cutting insert inserted in the groove and
   a clamping element, which passes through a receiving bore formed in the cutting insert and a bore formed in at least one of the groove branches, and which clamps the cutting insert against said first groove branches,
   wherein the central axis of the bore in said first groove branch is offset relative to the central axis of the receiving bore in the cutting insert, and
   wherein the clamping element and the cutting insert form a wedge-face mechanism such that the cutting insert in an assembled condition of the boring tool is pressed in the direction of the longitudinal axis against a first stop face and in the direction of the transverse axis against a second stop face, wherein the cutting insert is provided with an extension which runs in the direction of the longitudinal axis and which reaches into a recess which extends from a groove base face of the groove in the direction of the longitudinal axis to the shank portion, and in which there is provided the second stop face, and
   the second stop face as well as a side face on the extension of the cutting insert bearing against the second stop face are formed as one of plane faces and curved faces which are parallel relative to the longitudinal axis.

2. A boring tool according to claim 1, wherein the groove base face forms the first stop face, and said groove face as well as the side face of the cutting insert bearing against the groove base face are formed as plane faces oriented perpendicular to the longitudinal axis.

3. A boring tool according to claims 1 or 2, wherein the central axis of the receiving bore in the cutting insert is offset in the direction of the longitudinal axis and in the direction of the transverse axis, and wherein the second stop face as well as the side face on the projection of the cutting insert bearing against the second stop face are formed as plane faces oriented perpendicular to the transverse axis.

4. A boring tool according to claim 1, which comprises at least one flute which extends helically at an external circumference of the holder and which both tapers out in the region of one of the tool faces of the cutting insert and merges flush thereinto.

5. A boring tool according to claim 1, wherein the clamping element comprises a rotationally symmetric member.

6. A boring tool according to claim 5, wherein the clamping element comprises a clamping bolt with a head portion, with a clamping shank portion and with an externally threaded portion wherein in an assembled condition the head portion is disposed in a bore portion, in said first groove branch, the clamping shank portion passes through the receiving bore in the cutting insert and the externally threaded portion engages in an internally threaded bore portion of the bore in the other groove branch.

7. A boring tool according to claim 5, wherein the central axis of the receiving bore in the cutting insert is offset, relative to the central axis of the bore extending through both groove branches, in a manner parallel to the direction of the longitudinal axis and to the direction of the transverse axis.

8. A boring tool according to claims 5 or 6, wherein the central axis of the receiving bore in the cutting insert and the central axis of the bore extending through both groove branches each lie in one of two parallel planes disposed spaced apart in the direction of the longitudinal axis, wherein the central axis of the receiving bore in the cutting insert, viewed in the direction of the longitudinal axis, intersects the central axis of the bore extending through both groove branches at an angle.

9. A boring tool according to claim 6, wherein at least portions of the receiving bore in the cutting insert and of the clamping bolt have a conical structure.

10. A boring tool according to claim 6, wherein the central axis of the bore extending through both groove branches intersects the longitudinal axis.

11. A boring tool according to claim 5, which comprises at a potion below a recess base face of the groove, a clamping slit extending in longitudinal direction to the shank portion, which slit lies in a plane, which is turned by an angle of between 0° and 30° relative to the plane defined by the transverse axis and the longitudinal axis, and in that the central axis of the bore extending through both groove branches is oriented normal to the plane of the clamping slit.

12. A boring tool according to claim 11, wherein a ratio of the diameter of the boring tool to the depth of the clamping slit in the direction of the longitudinal axis ranges between 2.5 and 6.

13. A boring tool according to claim 1, wherein the groove has in cross section a trapezoidal profile, and wherein the side faces of the groove branches are inclined at an inclination angle ($\zeta$) of 0° to 5° relative to the plane defined by the longitudinal axis and the transverse axis.

14. A boring tool according to claim 1, wherein the holder at least one coolant channel formed therein, which runs substantially in a direction of the longitudinal axis and emerges at the head portion of the holder.

15. A boring tool according to claim 14, wherein the groove branches have end faces, respectively, and wherein in a region disposed in the vicinity of the head portion of the holder, the coolant channel splits into two secondary channels, each of which emerges at one of said end faces of the groove branches.

* * * * *